(12) United States Patent
Zhou

(10) Patent No.: US 10,603,722 B2
(45) Date of Patent: Mar. 31, 2020

(54) LOCKING CHUCK

(71) Applicant: APEX BRANDS, INC., Apex, NC (US)

(72) Inventor: Jichun Zhou, Suzhou (CN)

(73) Assignee: Apex Brands, Inc., Apex, NC (US)

( * ) Notice: Subject to any disclaimer, the term of this patent is extended or adjusted under 35 U.S.C. 154(b) by 80 days.

(21) Appl. No.: 15/517,999

(22) PCT Filed: Oct. 9, 2015

(86) PCT No.: PCT/US2015/054868
§ 371 (c)(1),
(2) Date: Apr. 10, 2017

(87) PCT Pub. No.: WO2016/057886
PCT Pub. Date: Apr. 14, 2016

(65) Prior Publication Data
US 2017/0252832 A1  Sep. 7, 2017

Related U.S. Application Data

(60) Provisional application No. 62/062,788, filed on Oct. 10, 2014.

(51) Int. Cl.
*B23B 31/12* (2006.01)
(52) U.S. Cl.
CPC ........ *B23B 31/123* (2013.01); *B23B 31/1238* (2013.01); *B23B 2231/06* (2013.01);
(Continued)
(58) Field of Classification Search
CPC ............... Y10S 279/902; B23B 31/123; B23B 31/1238; B23B 2231/06; B23B 2231/38;
(Continued)

(56) References Cited

U.S. PATENT DOCUMENTS 5,125,673 A * 6/1992 Huff .................... B23B 31/1207
279/60
7,556,269 B2   7/2009 Cachod
(Continued)

FOREIGN PATENT DOCUMENTS

EP    1627700 A2    2/2006
FR    2920104 A1 *  2/2009  ........... B23B 31/123
WO    2008122159 A1  10/2008

OTHER PUBLICATIONS

International Search Report and Written Opinion of PCT/US2015/054868 dated Jan. 19, 2016, all enclosed pages cited.
(Continued)

*Primary Examiner* — Eric A. Gates
*Assistant Examiner* — Chwen-Wei Su
(74) *Attorney, Agent, or Firm* — Burr Forman LLP

(57) ABSTRACT

A chuck (10) has a body (14), a plurality of jaws (22), and a rotatable nut (16). A sleeve (18) is rotatable between a first rotational position and a second rotational position with respect to the nut. An annular array of first teeth (84) are non-rotatable with respect to the body. One or more second teeth (63) are non-rotatable with respect to the nut and axially movable with respect to the body. When the teeth engage, they resist the nut's rotation in the opening direction. An engagement between the sleeve and the one or more second teeth moves the one or more second teeth out of engagement with the first teeth when the sleeve moves from the second rotational position to the first rotational position and moves the one or more second teeth into engagement with the first teeth when the sleeve moves from the first rotational position to the second rotational position.

19 Claims, 10 Drawing Sheets

(52) U.S. Cl.
CPC ....... *B23B 2231/38* (2013.01); *Y10S 279/902* (2013.01); *Y10T 279/17632* (2015.01); *Y10T 279/32* (2015.01)

(58) Field of Classification Search
CPC ..... Y10T 279/17615; Y10T 279/17623; Y10T 279/17632; Y10T 279/32
See application file for complete search history.

(56) References Cited

U.S. PATENT DOCUMENTS

| | | | | |
|---|---|---|---|---|
| 7,722,054 | B2* | 5/2010 | Young | B23B 31/1238 |
| | | | | 279/140 |
| 7,946,594 | B2* | 5/2011 | Tan | B23B 31/123 |
| | | | | 279/140 |
| 8,616,561 | B2* | 12/2013 | Mason | B23B 31/123 |
| | | | | 279/140 |
| 10,099,295 | B2* | 10/2018 | Schenk | B23B 31/123 |
| 2005/0230926 | A1 | 10/2005 | Sakamaki et al. | |
| 2011/0316240 | A1 | 12/2011 | Yang | |
| 2014/0265163 | A1 | 9/2014 | Mason | |

OTHER PUBLICATIONS

Chapter I IPRP of PCT/US2015/054868 dated Apr. 11, 2017, all enclosed pages cited.

* cited by examiner

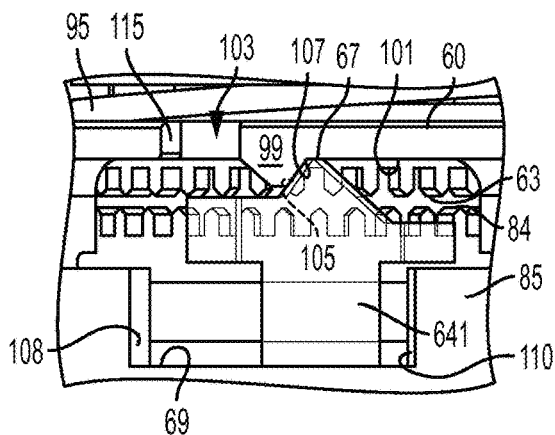
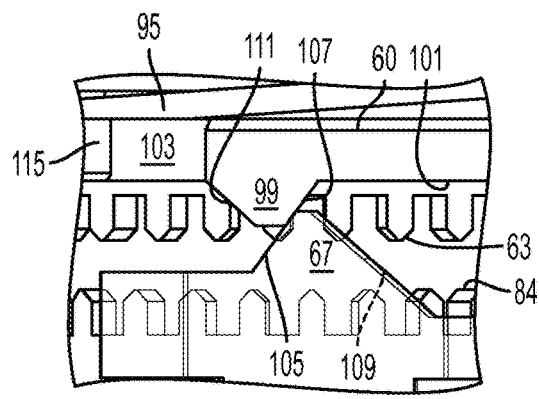
FIG. 3A  FIG. 3B
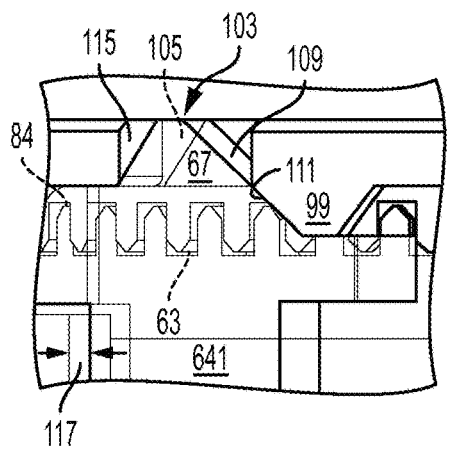
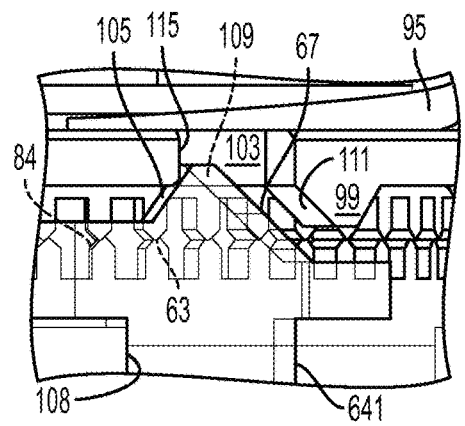
FIG. 3C  FIG. 3D
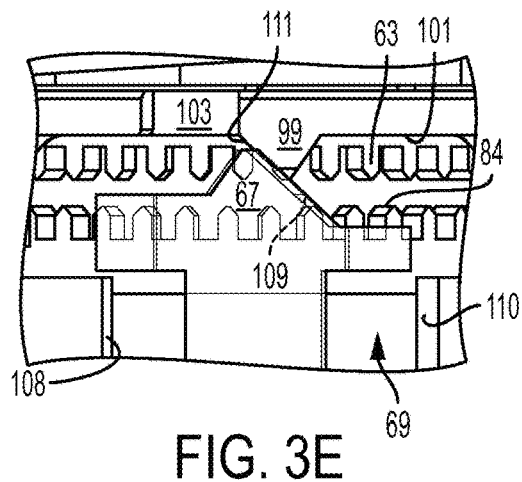
FIG. 3E

LOCKING CHUCK

FIELD OF THE INVENTION

The present invention relates generally to chucks for use with drills or other electric or pneumatic power drivers. More particularly, the present invention relates to a chuck of keyless type that may be tightened or loosened by hand or by actuation of the driver motor.

BACKGROUND OF THE INVENTION

Both hand and electric or pneumatic tool drivers are well known. Although twist drills are the most common tools on such drivers, the tools may also comprise screwdrivers, nut drivers, burrs, mounted grinding stones, and other cutting or abrading tools. Since the tool shanks may be of varying diameter or of polygonal cross section, the device is usually provided with a chuck adjustable over a relatively wide range. The chuck may be attached to the driver by a threaded or tapered bore.

A variety of chucks have been developed in the art. In an oblique jawed chuck, a chuck body includes three passageways disposed approximately 120° apart from each other. The passageways are configured so that their center lines meet at a point along the chuck axis forward of the chuck. The passageways contain three jaws that are movable in the passageways to grip a cylindrical or polygonal tool shank displaced approximately along the chuck center axis. The chuck includes a nut that rotates about the chuck center and that engages threads on the jaws so that rotation of the nut moves the jaws in either direction within the passageways. The body is attached onto the driveshaft of a driver and is configured so that rotation of the body in one direction with respect to the nut forces the jaws into gripping relationship with the tool shank, while rotation in the opposite direction releases the gripping relationship. The chuck may be keyless if it is rotated by hand. Examples of such chucks are disclosed in U.S. Pat. Nos. 5,125,673, 5,193,824, 7,722,054, and 8,616,561, commonly assigned to the present assignee and the entire disclosures of each of which are incorporated by reference herein for all purposes. Various configurations of keyless chucks are known in the art and are desirable for a variety of applications.

The present disclosure recognizes and addresses the foregoing considerations, and others, of prior art constructions and methods.

SUMMARY OF THE INVENTION

A chuck for use with a manual or powered driver having a rotatable drive shaft according to an embodiment of the present invention has a body having a nose section, a tail section, and a center axis, the tail section being configured to rotate with the drive shaft and the nose section having an axial bore formed therein and a plurality of passageways formed therethrough and intersecting the axial bore. A plurality of jaws are movably disposed in the passageways. A nut is rotatably mounted about the body and in operative communication with the jaws so that rotation of the nut in a closing direction with respect to the body moves the jaws toward the center axis of the body and rotation of the nut in an opening direction with respect to the body moves the jaws away from the center axis of the body. A sleeve is rotatably mounted about the body, the sleeve being in operative communication with the nut so that the sleeve rotationally drives the nut but is rotatable with respect to the nut between a first rotational position and a second rotational position. An annular array of first teeth are non-rotatable about the center axis with respect to the body and face toward the nose section of the body. One or more second teeth are non-rotatable about the center axis with respect to the nut and axially movable with respect to the body, and configured so that when the one or more second teeth engage the first teeth, the one or more second teeth and the first teeth resist rotation of the one or more second teeth, and thereby the nut, in the opening direction with respect to the body. An engagement between the sleeve and the one or more second teeth moves the one or more second teeth out of engagement with the first teeth when the sleeve moves from the second rotational position to the first rotational position and moves the one or more second teeth into engagement with the first teeth when the sleeve moves from the first rotational position to the second rotational position.

Another embodiment of a chuck for use with a manual or powered driver having a rotatable drive shaft has a body having a nose section, a tail section, and a center axis. The tail section is configured to rotate with the drive shaft, and the nose section has an axial bore formed therein and a plurality of passageways formed therethrough and intersecting the axial bore. A plurality of jaws are movably disposed in the passageways. A sleeve is rotatably mounted about the body and in operative communication with the jaws so that rotation of the sleeve in a closing direction with respect to the body moves the jaws toward the center axis of the body and rotation of the sleeve in an opening direction with respect to the body moves the jaws away from the center axis of the body. A lock is disposed operatively between the sleeve and the jaws, the sleeve being in operative communication with the lock so that the sleeve rotationally drives the lock but is rotatable with respect to the lock between a first rotational position and a second rotational position. An engagement between the sleeve and the lock moves the lock from a first condition at which the lock resists movement of the jaws in the passageways away from the center axis to a second condition at which the lock permits movement of the jaws in the passageways away from the center axis when the sleeve moves from the second rotational position to the first rotational position and that moves the lock from the second condition to the first condition when the sleeve moves from the first rotational position to the second rotational position. The engagement is configured so that a rotational torque applied to the sleeve at which the sleeve moves from the first rotational position to the second rotational position corresponds to an output gripping force between said plurality of jaws that is sufficient to secure a tool in the chuck for a predetermined purpose.

A chuck for use with a manual or powered driver having a rotatable drive shaft according to a further embodiment of the present invention has a body having a nose section, a tail section, and a center axis, the tail section being configured to rotate with the drive shaft and the nose section having an axial bore formed therein and a plurality of passageways formed therethrough and intersecting the axial bore. A plurality of jaws are movably disposed in the passageways. A nut is rotatably mounted about the body and in operative communication with the jaws so that rotation of the nut in a closing direction with respect to the body moves the jaws toward the center axis of the body and rotation of the nut in an opening direction with respect to the body moves the jaws away from the center axis of the body. A sleeve is rotatably mounted about the body, the sleeve being in operative communication with the nut so that the sleeve rotationally drives the nut but is rotatable with respect to the nut between a first rotational position and a second rotational position. An annular array of first teeth are non-rotatable about the center axis with respect to the body. One or more second teeth are non-rotatable about the center axis with respect to the nut and axially movable with respect to the body, the one or more second teeth being configured so that when the one or more second teeth engage the first teeth, the one or more second teeth and the first teeth resist rotation of the one or more second teeth, and thereby the nut, in the opening direction with respect to the body. An engagement between the sleeve and the one or more second teeth moves the one or more second teeth out of engagement with the first teeth when the sleeve moves from the second rotational position to the first rotational position and moves the one or more second teeth into engagement with the first teeth when the sleeve moves from the first rotational position to the second rotational position. The engagement is configured so that a rotational torque applied to the sleeve at which the sleeve moves from the first rotational position to the second rotational position corresponds to an output gripping force between said plurality of jaws that is sufficient to secure a tool in said chuck for a predetermined operation.

A chuck for use with a manual or powered driver having a rotatable drive shaft according to a further embodiment of the present invention has a body having a nose section, a tail section, and a center axis, the tail section being configured to rotate with the drive shaft and the nose section having an axial bore formed therein and a plurality of passageways formed therethrough and intersecting the axial bore. A plurality of jaws are movably disposed in the passageways. A nut is rotatably mounted about the body and in operative communication with the jaws so that rotation of the nut in a closing direction with respect to the body moves the jaws toward the center axis of the body and rotation of the nut in an opening direction with respect to the body moves the jaws away from the center axis of the body. A sleeve is rotatably mounted about the body, the sleeve being in operative communication with the nut so that the sleeve rotationally drives the nut but is rotatable with respect to the nut between a first rotational position and a second rotational position. An annular array of first teeth are non-rotatable about the center axis with respect to the body. One or more second teeth are non-rotatable about the center axis with respect to the nut and axially movable with respect to the body, the one or more second teeth being configured so that when the one or more second teeth engage the first teeth, the one or more second teeth and the first teeth resist rotation of the one or more second teeth, and thereby the nut, in the opening direction with respect to the body. An engagement between the sleeve and the one or more second teeth moves the one or more second teeth out of engagement with the first teeth when the sleeve moves from the second rotational position to the first rotational position and moves the one or more second teeth into engagement with the first teeth when the sleeve moves from the first rotational position to the second rotational position. The engagement is configured so that a rotational torque applied to the sleeve at which the sleeve moves from the first rotational position to the second rotational position is approximately fifty-seven inch-pounds or approximately sixty inch-pounds.

The accompanying drawings, which are incorporated in and constitute a part of this specification, illustrate one or more embodiments of the present invention.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying figures, in which:

FIGS. 3A-3E are schematic illustrations of an operation of the chuck as shown in FIG. 1, with a portion of the sleeve illustrated in transparent form for viewing radially inward components;

Figure 1:
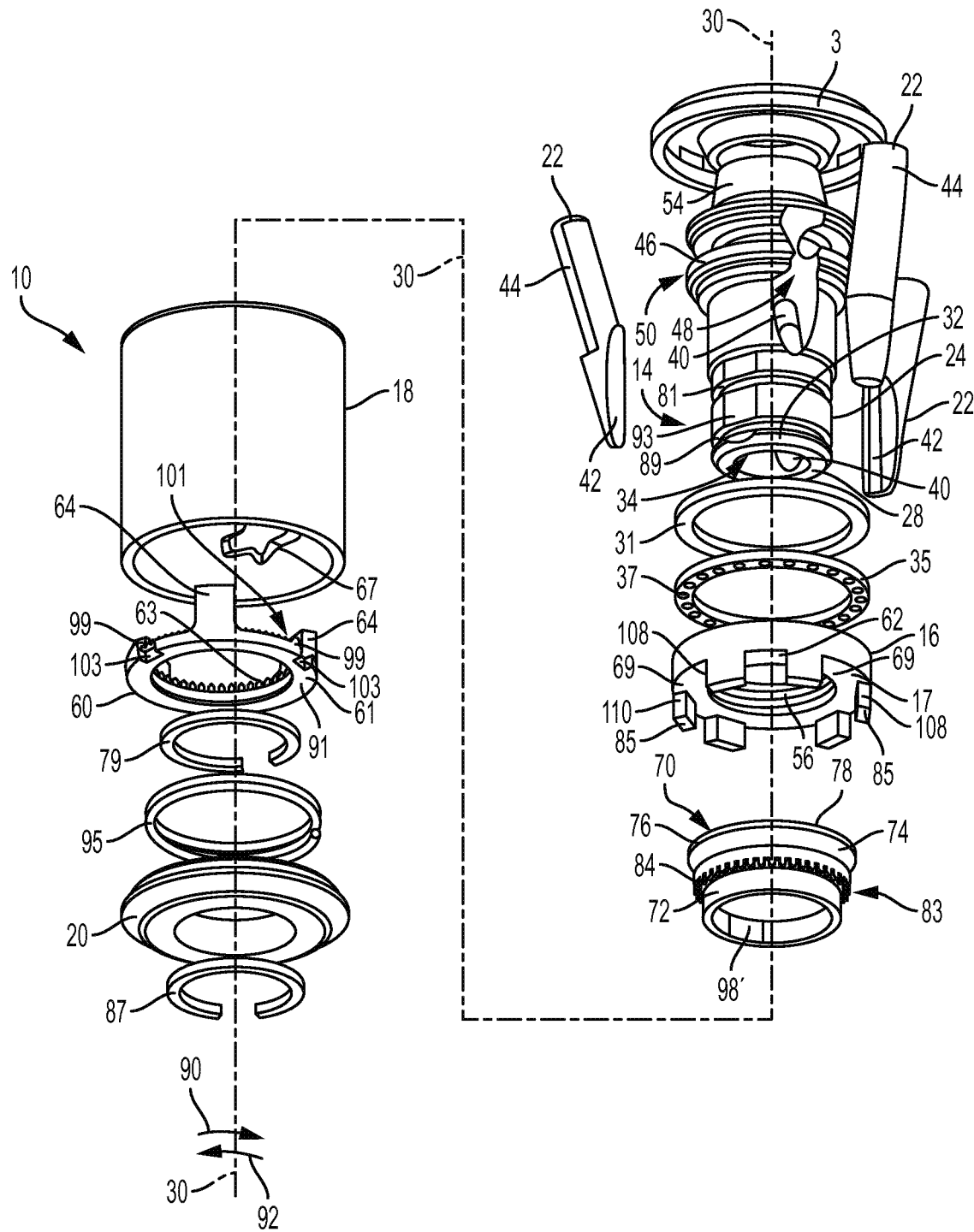
FIG. 1 is an exploded perspective view of a chuck in accordance with an embodiment of the present disclosure.

Repeat use of reference characters in the present specification and drawings is intended to represent the same or analogous features or elements of the invention.

DETAILED DESCRIPTION

Reference will now be made in detail to presently preferred embodiments of the disclosure, one or more examples of which are illustrated in the accompanying drawings. Each example is provided by way of explanation of the invention, not limitation of the invention. In fact, it will be apparent to those skilled in the art that modifications and variations can be made in the present disclosure without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

Figure 2:
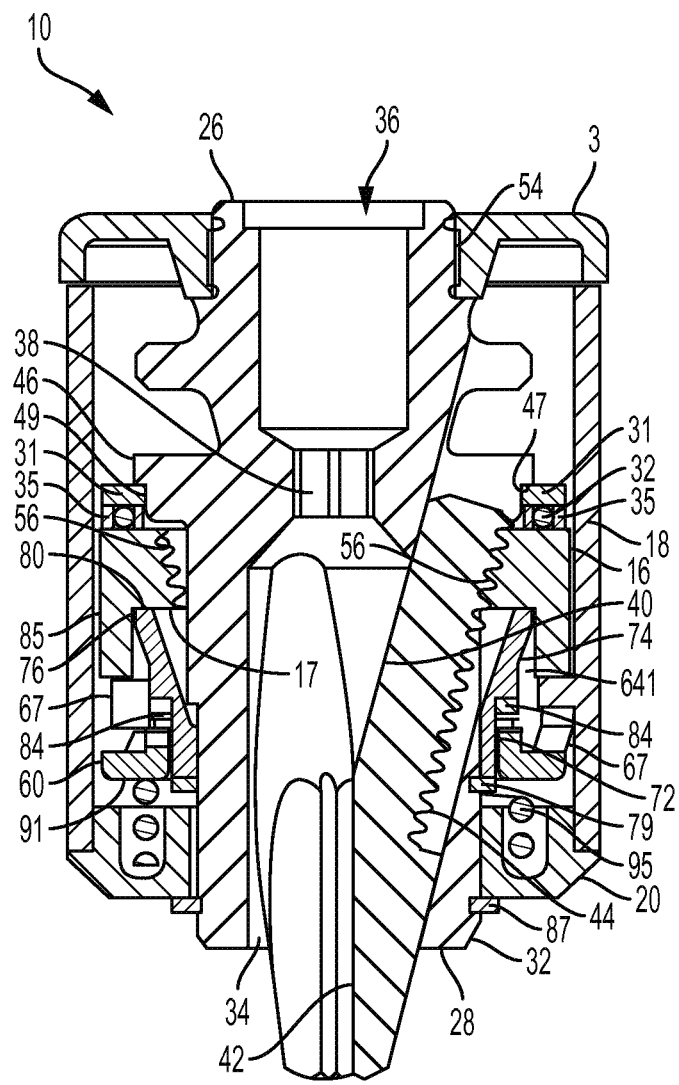
FIG. 2 is a longitudinal view, in section, of a chuck as shown in FIG. 1.
Figure 4:
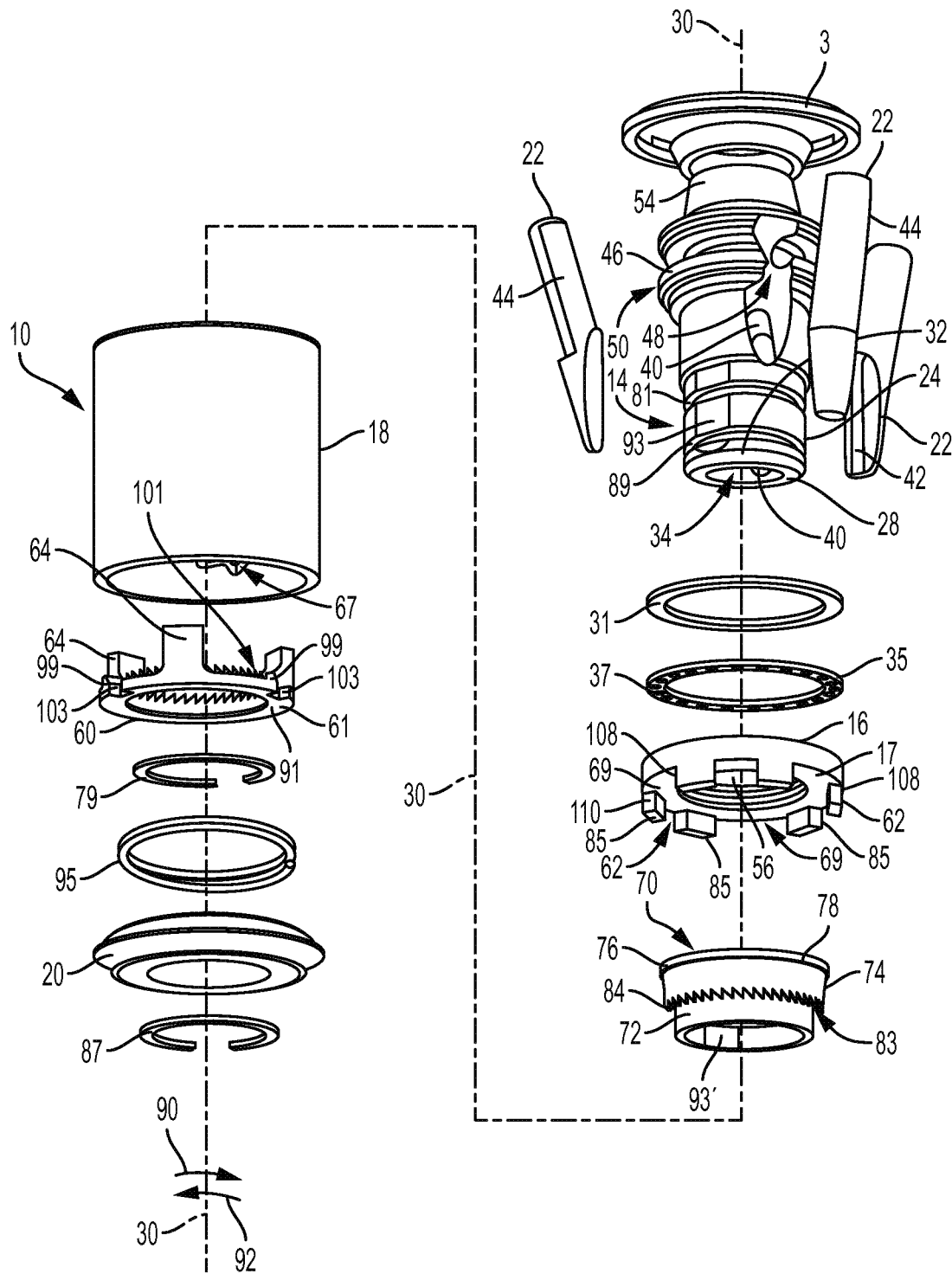
FIG. 4 is an exploded perspective view of a chuck in accordance with an embodiment of the present disclosure.
Figure 5:
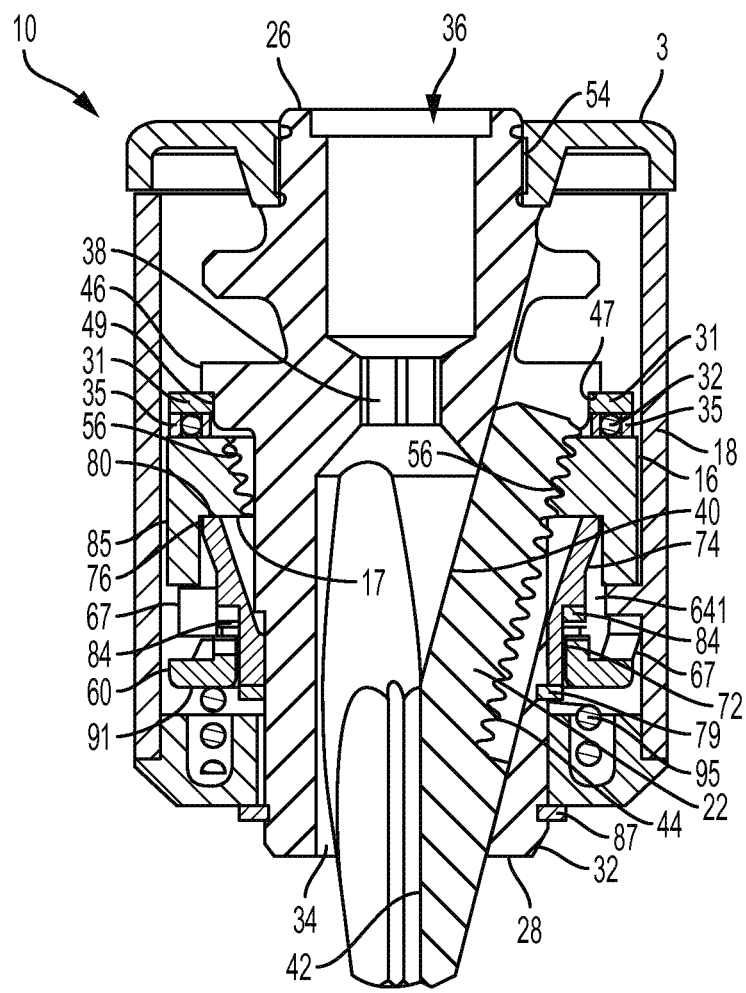
FIG. 5 is a longitudinal view, in section, of a chuck as shown in FIG. 4.
Figure 6A:
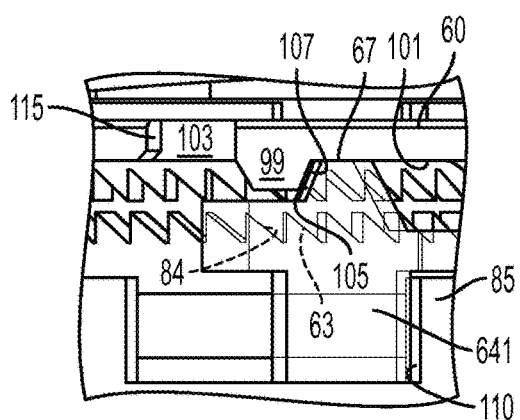
FIGS. 6A-6E are schematic illustrations of an operation of the chuck as shown in FIG. 4, with a portion of the sleeve illustrated in transparent form for viewing radially inward components.
Figure 6B:
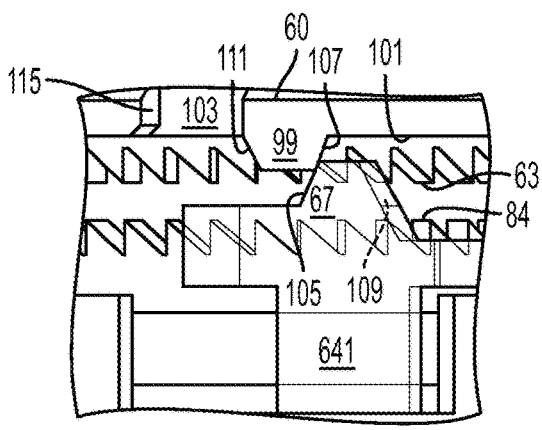
Figure 6C:
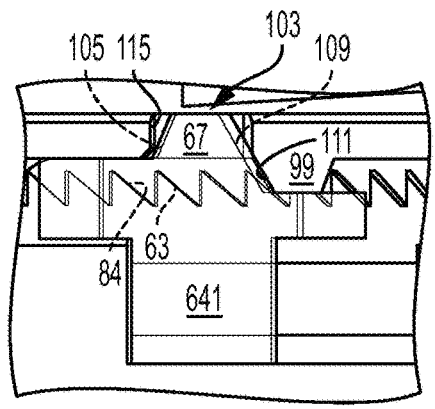
Figure 6D:
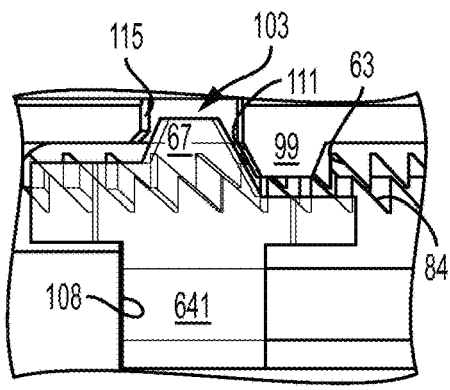
Figure 6E:
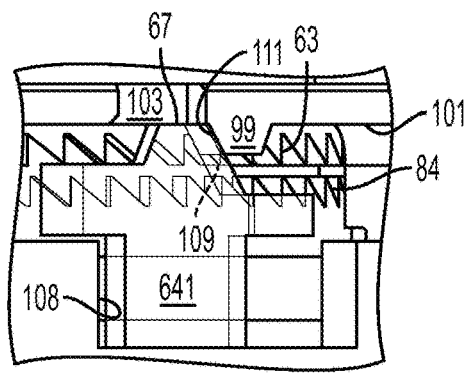

Referring to FIGS. 1 and 2, a chuck 10 includes a body 14, a nut 16, a front sleeve 18, a nose piece 20, a nut retainer member 70, a rear cover disk 3, and a plurality of jaws 22. Body 14 is generally cylindrical in shape and comprises a nose or forward section 24 and a tail or rearward section 26. Nose section 24 has a front face 28 transverse to the longitudinal center axis 30 of body 14 and a tapered surface 32 at its forward end. The nose section defines an axial bore 34 that is dimensioned somewhat larger than the largest tool shank that the chuck is designed to accommodate. A threaded bore 36 is formed in tail section 26 and is of a standard size to mate with a driveshaft of a powered or hand driver (not shown). The bores 34 and 36 may communicate at a central region 38 of body 14. While a threaded bore 36 is described herein, such bore could be replaced with a tapered bore of a standard size to mate with a tapered driveshaft. Furthermore, body 14 may be formed integrally with the driveshaft.

Body 14 defines three passageways 40 to accommodate three jaws 22. Each jaw is separated from each adjacent jaw by an arc of approximately 120°. The axes of passageways 40 and jaws 22 are angled with respect to the chuck center axis 30 such that each passageway axis travels through axial bore 34 and intersects axis 30 at a common point ahead of the chuck body. The jaws form a grip that moves radially toward and away from the chuck axis to grip and release a tool, and each jaw 22 has a tool engaging face 42 generally parallel to chuck body axis. Threads 44, formed on each jaw's opposite or outer surface, may be constructed in any suitable type and pitch, and in certain embodiments described herein in a type and pitch to achieve a desired grip torque in response to a predetermined sleeve tightening torque. As illustrated in FIGS. 1 and 2, body 14 includes a thrust ring 46 that, in one or more embodiments, may be integral with the main portion of the body. It should be understood, however, that thrust ring 46 and the main portion of body 14 may be separate components. Thrust ring 46 includes a plurality of guideways 48 formed around its circumference to permit retraction of jaws 22 therethrough and also includes a ledge portion 50 to receive a bearing 31 and 35. Ledge portion 50 includes a first surface 47 and a second surface 49. First surface 47 extends radially outwardly away from, and is perpendicular to, chuck body longitudinal center axis 30. Second surface 49 extends axially along, and is concentric about, chuck body longitudinal center axis.

Body tail section 26 includes a knurled surface 54 that receives an optional rear sleeve (not shown) or cover disk 3 in a press fit. The rear sleeve or disk could also be retained by press fit without knurling, by use of a key or by crimping, staking, riveting, threading or any other suitable securing mechanism. In the presently described embodiments, the chuck is constructed with a single hand-grippable sleeve (18) with a rear disk (3), but it should be understood that two-sleeve (rear and front sleeve) embodiments are also encompassed by the present disclosure.

Retainer member 70 includes a first generally cylindrical portion 72, a second generally cylindrical portion 76, and a frustoconical portion 74 extending therebetween. First cylindrical portion 72 is configured to be press fit over nose section 24 in a location so that a rear edge 78 of second cylindrical portion 76 will engage nut 16 to prevent nut 16 from moving axially forward more than a desired amount. More specifically, rear edge 78 defines an annular engagement surface 80 that is configured to abut a forward axial face 17 of nut 16. This desired amount of axial movement can be determined by the location in which nut retainer member 70 is pressed or otherwise retained onto the body member. It should be appreciated that although nut retainer member 70 may be adapted to be press fit onto the nose portion of the body, it may be secured in any other suitable manner in accordance with the present disclosure. For example, and as illustrated in FIGS. 1, 2, 4, 5, 8, and 9, the inner bore of nut retainer member 70 may be configured in a clearance fit with regard to nose section 24 of body 14 so that the nut retainer slides onto the body and is retained axially in a forward direction by a C-clip 79 that is received in a circumferential groove 81 in body nose section 24. Nose section 24 of body 14 includes a flat portion 93 that opposes a corresponding flat 93' in the inner diameter of nut retainer 70, thereby rotationally fixing nut retainer 70 with respect to body 14.

Additionally, first cylindrical portion 72 defines an annular ratchet 83 including an array of locking teeth 84. Locking teeth 84 of the ratchet are disposed radially inwardly of annular engagement surface 80 and of a plurality of dogs 85 that extend forward from face 17 of nut 16. Locking teeth 84 extend forwardly, so that the forwardmost distal edges of the teeth lie in a common plane perpendicular to center axis 30. The teeth face forwardly, along the line of center axis 30, toward body front face 28. As such, when annular engagement surface 80 is received on forward axial face 17 of nut 16, locking teeth 84 are disposed radially inwardly of dogs 85 and face axially forward away from nut forward face 17.

Nose piece 20 may also be press fit to a cylindrical portion of body nose section 24, but in the presently illustrated embodiments, nose piece 20 is retained on nose section 24 against forward axial movement by a C-clip 87 received in a groove 89 in the nose section 24. Nose piece 20 may be coated with a non-ferrous metallic coating to prevent rust and to enhance its appearance. Examples of suitable coatings include zinc or nickel, although it should be appreciated that any suitable coating could be utilized.

Chuck 10 includes a generally annular lock ring 60 disposed within the inner circumference of sleeve 18 and axially between nose piece 20 and a plurality (in this instance, three) cam dogs 67 disposed equidistantly around the sleeve's inner diameter and extending radially inward therefrom. As explained in more detail below, lock ring 60 engages the cam dogs on the axially rearwardly facing side of lock ring 60. A coil spring 95 is disposed operatively between nose piece 20 and the axially forwardly facing surface of lock ring 60. An axially rearward end of coil spring 95 engages a generally planar (in a plane transverse to axis 30) annular surface 91 of lock ring 60, while an axially forward end of spring 95 is received in an axially rearwardly facing annular recess of nose piece 20. As nose piece 20 is retained in the axially forward direction by C-clip 87, spring 95 biases lock ring 60 in the axially rearward direction with respect to the body, i.e. into cam dogs 67 and toward locking teeth 84. As described in more detail below, drive dogs 641 (FIGS. 3A-3E, 6A-6E, 7, and 10) that extend axially opposite cam dogs 67 are received in respective corresponding grooves 69 defined in nut 16 between adjacent dogs 85, thereby (and in conjunction with rear disk 3) retaining sleeve 18 in the axially rearward direction.

The outer circumferential surface of front sleeve 18 may be knurled or may be provided with longitudinal ribs or other protrusions to enable the operator to grip the sleeve securely. In like manner, the circumferential surface of a rear sleeve, if employed, may be knurled or ribbed if desired. The front and rear sleeves may be molded or otherwise fabricated from a structural plastic such as polycarbonate, a filled polypropylene, for example a glass filled polypropylene, or a blend of structural plastic materials. Other composite materials such as, for example, graphite filled polymerics may also be suitable in certain environments. As should be appreciated by one skilled in the art, the materials from which the chuck of the present disclosure is fabricated will depend on the end use of the chuck, and the above materials are provided by way of example only.

Figure 7:
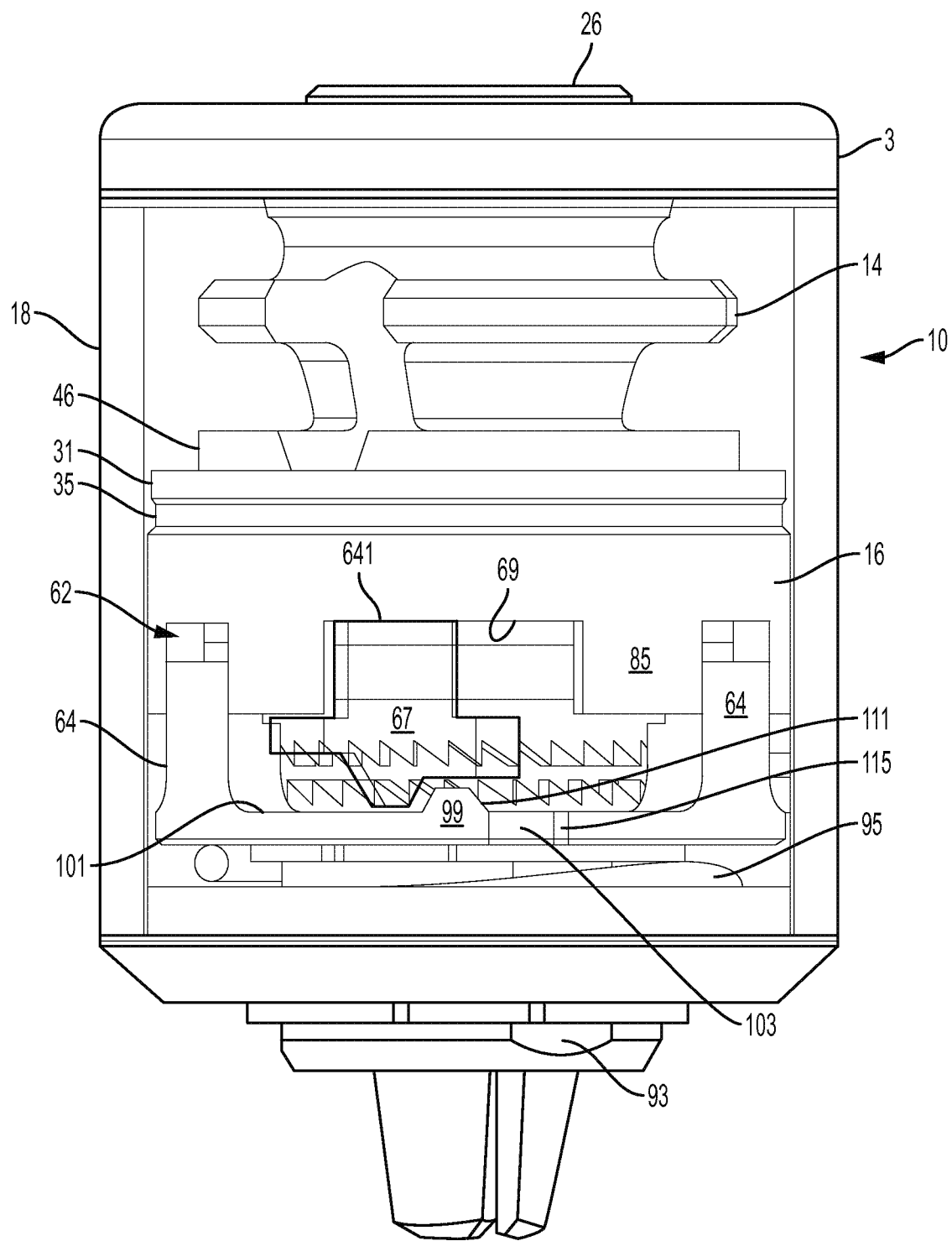
FIG. 7 is a longitudinal view of the chuck as in FIG. 4, with the front sleeve illustrated in a transparent form for view of radially inward components.
Figure 10:
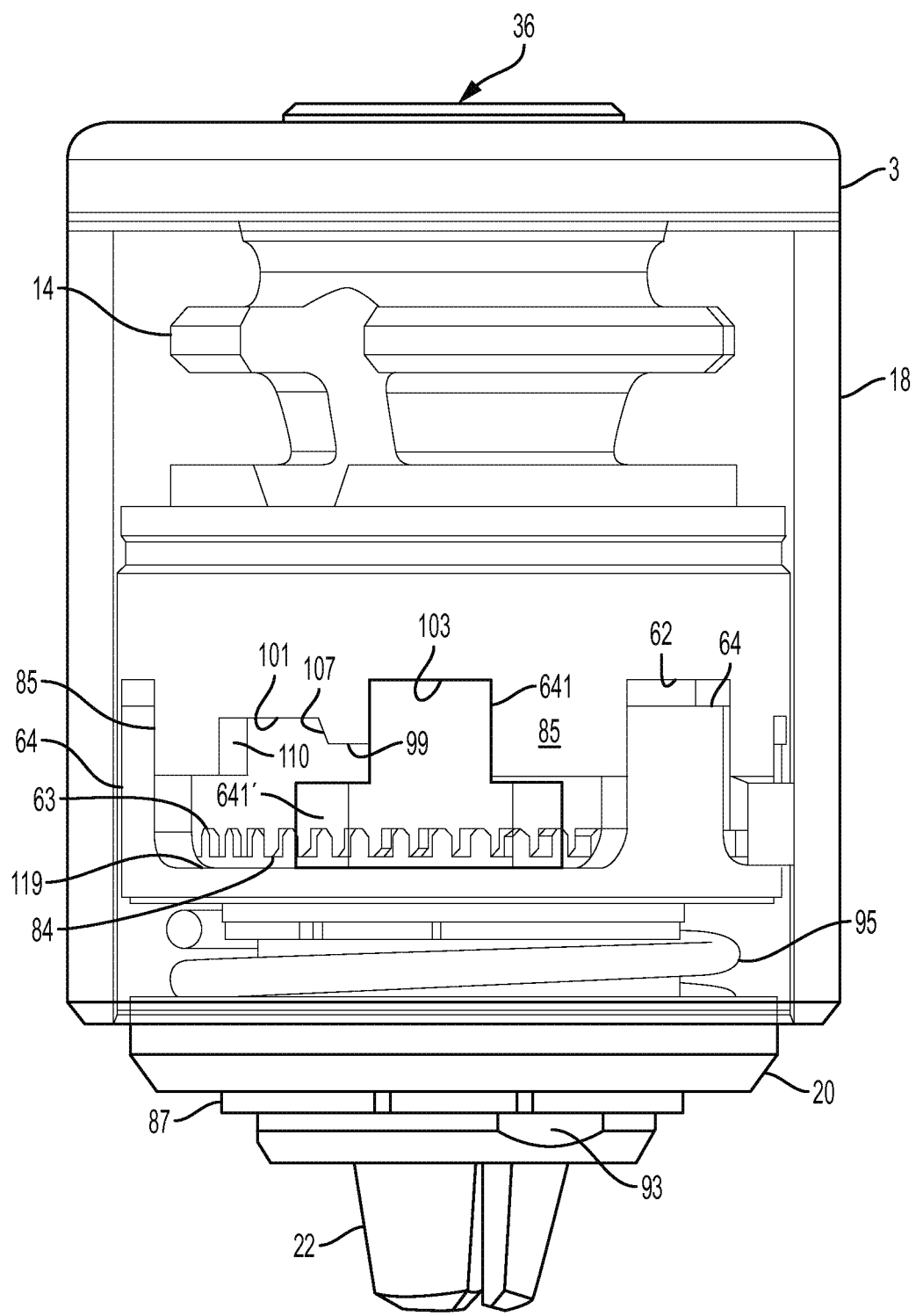
FIG. 10 is a longitudinal view of the chuck as shown in FIG. 8, with the front sleeve illustrated in a transparent form for view of radially inward components.

Nut 16 has threads 56 for mating with jaw threads 44. Nut 16 is positioned about the body in engagement with the jaw threads so that when the nut is rotated with respect to the body, the jaws will be advanced or retracted, depending on the nut's rotational direction. Additionally, the nut's forward axial face 17 includes recesses 62 that receive respective drive dogs 64 extending from lock ring 60. Each recess 62 extends axially rearwardly from the axially forward distal ends of dogs 85 and terminates at the planar surface 17 that is substantially transverse to the chuck's longitudinal center axis 30 (which is also the center of rotation of the nut). The angular width of recesses 62 is approximately equal to the angular width of lock ring dogs 64, although there is sufficient clearance to allow a sliding fit between the two. As described below, although lock ring 60 travels slightly axially with respect to nut 16, the depth of recesses 62 and the length of dogs 64, are sufficient that dogs 64 remain engaged within their respective recesses 62 throughout the operation of chuck 10, including through the lock ring's axial movement with respect to the nut, for example as illustrated in FIGS. 7 and 10. Due to the approximately equal angular widths of dogs 64 and recesses 62, the application of torque to lock ring 60 applies same-direction torque to nut 16. As also described below, sleeve 18 transfers torque to the lock ring through engagement of sleeve cam dogs 67 and lock ring 60 (in certain instances, the sleeve transfers torque directly to the nut). Accordingly, rotational torque applied to sleeve 18 is transferred through such engagement to lock ring 60 and, through the engagement of dogs 64 with recesses 62, to nut 16. Thus, rotation of sleeve 18 in the opening or closing direction also rotates nut 16 in the same opening or closing direction. Due to the thread direction of threads 56, rotation of nut 16 in one rotational direction about axis 30 causes jaws 22 to move radially inward toward axis 30, while rotation of nut 16 in the opposite rotational direction about axis 30 causes jaws 22 to move radially away from axis 30 in respective passageways 40.

As noted, drive dogs 641 (FIGS. 3A-3E, 6A-6E, 7, and 10) of sleeve 18 are received in respective grooves 69 (FIGS. 1-7) defined between adjacent dogs 85 of nut 16. Each recess 69 extends axially rearwardly from the forward distal ends of nut dogs 85 and terminates at nut face 17. The angular width of drive dogs 641 is less than that of recesses 69, resulting in a limited range of allowed relative rotational movement between sleeve 18 and nut 16 (and, because of the engagement of dogs 64 and recesses 62, lock ring 60), for example between 16° and 20°. Each recess 69 has a pair of opposed sidewalls 108 and 110 adapted to be selectively abutted by respective drive dogs 641 to thereby define the range of the limited allowed relative rotational movement.

Lock ring 60 includes an annular ring portion 61 and a plurality of locking teeth 63. Locking teeth 63 extend axially rearwardly from annular ring portion 61 to distal ends of the teeth that lie generally in a common plane transverse to axis 30. The inner and outer diameters (in the radial direction with respect to axis 30) of the ring of teeth 63 are approximately the same as the inner and outer diameters of teeth 84 on nut retainer member 70. Thus, teeth 63 oppose teeth 84 in the axial direction and selectively engage teeth 84 depending on axial movement of lock ring 70, as described below. The angular width of teeth 63 and 84, and the spacings between the teeth, are selected so that when teeth 63 engage teeth 84, lock ring 60 is rotationally fixed to nut retainer 70 and, therefore, to body 14. The ring of teeth 63 is radially inward of dogs 64, which extend into recesses 62 over the outer diameter of nut retainer 70.

Lock ring 60 is a clutch that selectively rotationally fixes the nut to, and rotationally releases the nut from, the body, as actuated by sleeve 18. Each sleeve cam dog 67 extends axially forwardly to either side of a respective opposing cam dog 99 extending rearward from annular ring portion 91 of lock ring 60, depending on the sleeve's rotational position with respect nut 16 and lock ring 60 as described below. In an unlocked condition of chuck 10, each sleeve cam dog 67 is received in a corresponding gap 101 between its lock ring cam dog 99 and the adjacent dog 64. In the locked position of chuck 10, each sleeve cam dog 67 is received in a respective gap 103 in annular ring portion 61 of lock ring 60.

As described in more detail below, gaps 101 and 103 have different axial heights, such that when cam dogs 67 are received in respective gaps 101, the cam dogs force ring 60 axially forward against the bias provided by spring 95. In this condition, teeth 63 are disengaged from teeth 84 on nut retainer 70, and sleeve drive dogs 641 can abut respective faces 110 of recesses 69 so that rotation of sleeve 18 in a chuck opening direction 92 drives nut 16 in the jaw-opening direction. On the other side, and referring also to FIGS. 3A-3E, a first engaging face 105 of sleeve cam dog 67 engages a corresponding opposing engaging face 107 of lock ring cam dog 99. Accordingly, rotation of sleeve 18 by the hand of a user in a chuck closing, or jaw-closing, direction 90 rotationally drives lock ring 60 in the same rotational direction through the engagement of these surfaces, thereby rotating nut 16 in the same direction through the engagement of lock ring dogs 64 and nut recesses 62.

When sleeve 18 is in the second rotational position with respect to nut 16 and lock ring 60, gaps 103 of ring 60 receive respective sleeve cam dogs 67. Opposite engagement surfaces 109 of sleeve cam dogs 67 engage respective opposing engagement faces 111 of lock ring cam dog 99. Engagement surfaces 105 are engagable with respective edges 115 of gaps 103.

Due to the greater depth of gap 103 in the forward axial direction, as compared to gap 101, the reception of sleeve cam dogs 67 in respective gaps 103 allows lock ring 60 to move axially rearward under the bias of spring 95 so that teeth 63 of ring 60 engage teeth 84 of nut retainer 70. Since nut retainer 70 is rotationally fixed to body 14, this rotationally fixes lock ring 60 to the body. Further, since nut 16 is rotationally fixed to lock ring 60 through the engagement of lock ring dogs 64 and nut recesses 62, this also rotationally fixes nut 16 to the body, thereby inhibiting the nut's undesired rotation in the tightening or loosening directions during the chuck's normal use in operation of the driver.

A bearing washer 31 and an annular bearing cage 35 are received between thrust ring 46 of body 14 and nut 16. Bearing washer 31 is disposed adjacent first surface 47 of thrust ring 46, such that a plurality of bearing elements, in this case bearing balls 37, of bearing cage 35 make contact with its axially forward surface and an axially rearward surface of nut 16.

FIG. 3A illustrates the disposition of lock ring teeth 63 when sleeve 18 is in the first of the two positions with respect to nut 16, while FIG. 3C illustrates these components when the sleeve is in the second position with respect to the nut and lock ring. For ease of illustration, FIGS. 3A-3E omit the front sleeve from view, except for cam dogs 67 and drive dogs 641. While these figures illustrate a single cam dog 67/99 pair, it should be understood that the chuck defines three equidistantly-spaced such cam pairs. Although FIGS. 3A-3E illustrate only one such pair, it should be understood the operation of the other two pairs is identical and that the three pairs operate in the same manner simultaneously with each other. Thus, the present disclosure describes the operation of one of the pairs as exemplary of the simultaneous operation of all three.

Referring to FIG. 3A, when sleeve 18 is disposed in the first position with respect to the nut and the lock ring, sleeve cam dog 67 is received in gap 101 of lock ring 60. If the user grips sleeve 18 and applies torque thereto to rotate the sleeve in opening direction 92 (FIG. 1), sleeve drive dog 641 moves angularly into engagement with side 110 of nut dog 85, so that the sleeve's further rotation rotates nut 16 in opening direction 92, thereby moving jaws 22 rearwardly in passageways 40 and away from chuck axis 30. If the user applies torque to sleeve 18 in closing direction 90 (FIG. 1), sleeve cam dog 67 moves slightly in direction 90 with respect to the nut and lock ring so that sleeve cam dog engaging face 105 engages lock ring cam dog engaging face 107. Faces 105 and 107 are generally planar so that their engagement causes the faces to be flush against each other. The two planar faces are disposed at an acute angle with respect to axis 30. As noted, the depth of gap 101 in the axial direction, with respect to the engagement of sleeve cam dog 67 with the bottom of the gap, is such that teeth 63 are disengaged from teeth 84. Thus, continued application of torque to sleeve 18 in closing direction 90 causes sleeve cam dog 67 to transmit torque to lock ring 60 through the engagement of surfaces 105 and 107. Because teeth 63 and 84 are disengaged from each other, this causes lock ring 60 also to rotate in closing direction 90. Since nut 16 is rotationally fixed to lock ring 60, this correspondingly causes nut 16 to rotate in closing direction 90, in turn moving jaws 22 radially inward in passageways 40 toward axis 30.

Referring also to FIGS. 1 and 2, as the jaws move radially inward in their passageways, jaw faces 42 eventually close upon the outer surface of a bit shank received within chuck bore 34. When the jaws close upon the bit and apply a grip torque thereto, the bit prevents the jaws' further radial inward movement in the jaw passageways. As the user continues to apply tightening torque to sleeve 18 in closing direction 90, thereby applying torque to nut 16 also in closing direction 90, the nut is urged rearward up the jaw threads, thereby pushing the nut against bearing cage 35, bearing washer 31, and thrust ring 46. Because the jaws can no longer move within their passageways, this further application of torque to nut 16 causes nut threads 56 to wedge against jaw threads 44, thereby resisting the nut's further rotation and, because of the interaction of lock ring dogs 64 and nut recesses 62, also resisting further rotation of nut ring 60. As the user continues to apply tightening torque to sleeve 18 in closing direction 90, the resistance of the nut, and therefore the lock ring, to further rotation eventually overcomes frictional resistance between face 105 of cam dog 67 and face 107 of cam dog 99, and ring cam dog 99 begins to move axially forward on cam dog 67. Referring to FIG. 3B, this pushes ring 60 axially forward against the bias of spring 95 (FIG. 1) so that the distal end of lock ring cam dog 99 passes over the distal peak of sleeve cam dog 67, allowing sleeve cam dog 67 to be received in gap 103, as shown in FIG. 3C. As noted above, this allows lock ring 60 to move axially rearward under the bias of spring 95 and engages teeth 63 of lock ring 60 with teeth 84 of belt retainer 70. Nut 16 is now rotationally fixed with respect to body 14 via the rotational fixation of nut retainer 70.

As illustrated in FIG. 1 and indicated in FIGS. 3A-3E, each tooth of the ring of teeth 63, and each tooth of the ring of teeth 84, has opposing sides in the angular direction that have straight edges (and in the illustrated embodiments are generally planar) that are parallel to each other and to axis 30. As a result, when teeth 63 are received by teeth 84 in an interengaging manner, as shown in FIG. 3C (the distal ends of teeth 63 and 84 may be chamfered, as shown, to facilitate the interengagement), the application of torque to the lock ring and nut through vibrations in the operation of the chuck as it is driven by the driver is unlikely to cause rotational movement between the nut and the nut retainer and, therefore, between the nut and the chuck body. This results in a more positive lock between the nut and the body that resists the chuck's undesired tightening or loosening. If, however, the user wishes to further tighten the chuck after the lock has engaged, the user can apply further tightening torque to sleeve 18. Referring to FIG. 3D, this tightening torque translates to the engagement between engagement surface 105 of sleeve cam dogs 67 and side surfaces 115 of gaps 103. As noted, engagement surface 105 is disposed at an acute angle with respect to chuck axis 30. In this embodiment, surface 105 engages edge 115 at the corner of edge 115, but it should be understood that side 115 may be formed with an opposing, correspondingly angled surface (which may be at an acute angle with respect to the chuck axis, as indicated in FIGS. 6A-6E). A slight gap 117 exists between the leading edge of dog 641 and nut dog side face 108, allowing the sleeve to move slightly with respect to the nut in the closing direction and thereby causing lock ring surface 115, to move forward, up surface 105. As the user continues to apply torque to sleeve 18 in closing direction 90, therefore, ring 60 moves axially forward against the bias of spring 95. As indicated in FIG. 3D, this causes teeth 63 to disengage from teeth 84. The depth of the interengagement between teeth 63 and teeth 84 is less than the depth of engagement of cam dog 67 into lock ring gap 103. Thus, teeth 63 disengage from teeth 84 before edge surface 115 slides over the peak of sleeve cam dog 67. That is, sleeve cam dog 67 remains engaged with lock ring gap 103 when teeth 63 disengage from teeth 84. At this point, lock ring 60 and nut 16 are no longer rotationally locked to body 14, and the application of further torque to sleeve 18 in closing direction 90 moves lock ring 60 and nut 16 in closing direction 90. Eventually, teeth 63 move over and past the tops of teeth 84. When teeth 63 become again aligned with the gaps between teeth 84, the bias of spring 95 moves lock ring 60 axially rearward so that teeth 63 again engage teeth 84. The user may further tighten the nut onto the jaw threads by applying further torque to sleeve 18 in closing direction 90 and repeating the process. Eventually, the resistance of nut 16 becomes so great, as the nut threads wedge further with the jaw threads, that the user is no longer able to rotate the lock ring and the nut in the closing direction.

To open the chuck from the locked condition, and referring now to FIG. 3E and FIG. 1, the user applies torque to sleeve 18 in opening direction 92. This moves cam dog 67 slightly to the right from FIG. 3D to FIG. 3E in gap 103 until sleeve cam dog surface 109 engages lock ring cam dog surface 111. These opposing, parallel surfaces are also angled at an acute angle with respect to chuck axis 30. Surface 109 engages surface 111 before the leading edge of sleeve drive dog 641 engages the opposing edge 110 of nut dog 85 at the other end of recess 69. Thus, the sleeve applies torque in the opening direction to the nut via the engagement between the sleeve cam dog and lock ring 60, and thereby between lock ring 60 and the nut, rather than directly between sleeve drive dog 64 and edge 110 of recess 69. The engagement of teeth 63 with teeth 84 resists the nut's rotation with respect to the body. Upon application of torque by the user to the sleeve sufficient to overcome the frictional engagement between surfaces 111 and 109, however, surface 111 moves up surface 109, pushing ring 60 axially forward against the bias of spring 95 and thereby disengaging teeth 63 from teeth 84. Although now no longer rotationally locked to the body, the nut remains wedged with the jaw threads, such that the nut does not immediately rotate in the opening direction. Surface 111 therefore continues to ride up surface 109 until the distal end of the lock cam dog passes over the distal end of the sleeve cam dog and sleeve cam dog 67 is once again received in lock ring gap 101, as shown in FIG. 3A. The user's continued application of torque to sleeve 18 in opening direction 92 moves sleeve drive dog 641 into engagement with edge 110 of nut dog 85 so that the user may apply opening torque to overcome the wedge between the nut threads and the jaw threads and thereby drive the nut in the opening direction to open the chuck and moves the jaws radially outward in their passageways.

The movement of sleeve 18 from the first rotational position with respect to the nut to the second rotational position, i.e. the sleeve cam dogs' movement from gaps 101, over lock ring cam dogs 99, and into gaps 103, produces an audible click and a slight vibration in the sleeve. Thus, the user receives audible and tactile indications that the user has actuated the locking clutch and moved the chuck into the locked condition. Once the nut stops rotating, the amount of torque in closing direction 90 needed to be applied to sleeve 18 to move the sleeve from the first position to the second position is a function of several variables, i.e. the angle of surfaces 105 and 107 with respect to chuck axis 30, the amount of friction between those surfaces (considering lubricant, if any, applied between these components), the bias force applied by spring 95, and the distance needed for ring 60 to travel against that bias in order for the sleeve cam dog and the lock ring cam dog to pass over each other (i.e. dog height). Given that, for any given user, there will be a maximum amount of torque that particular user will be able to apply to sleeve 18 in closing direction 90, and that this maximum capable torque varies from user to user, it is believed that among the significant majority of users, the lowest maximum torque those users are able to apply to the sleeve is approximately sixty inch-pounds. For the presently described embodiments, therefore, the angle of surfaces 105 and 107 with respect to chuck axis 30, the frictional co-efficient between those surfaces (as defined by the materials from which they are made and any coatings, such that the selection of such materials corresponds to selection of frictional performance), the dog height, and the force of spring 95 are chosen so that the rotational torque in closing direction 90 needed to move sleeve 18 from the first rotational position with respect to nut 16 to the second rotational position is approximately sixty inch-pounds. In a further embodiment, these variables are chosen so that the rotational torque needed to move the sleeve from the first to the second rotational position is slightly below sixty inch-pounds, for example approximately 5% below that level. By approximating the point at which the chuck moves from an unlocked to a locked position to the upper end of the user's ability to apply torque to the chuck sleeve, and by providing to the user audible and tactile notification that the chuck has moved to the locked position, the presently-described embodiments allow the user to manually tighten the chuck in a single smooth motion up to the maximum tightness, without need to tighten the chuck further after locking occurs. Because the lock occurs at the point at which the user has generally applied the greatest amount of torque the user would apply, or close to that point, the occurrence of the locking notification occurs at a point at which the user intuitively understands that the chuck is fully tightened, thereby precluding uncertainty in the user regarding whether further tightening is required.

As will also be understood in view of the present disclosure, these variables, and in addition the pitch of the nut and jaw threads, the form of the threads, the tightness of the thread mesh, the type of lubricant, if any, provided between the nut threads and the jaw threads, the materials from which the nut threads and the jaw threads are made and/or finished (for example, in one presently described embodiment, the nut threads and the jaw threads are coated with zinc phosphate), the bearing system, the angle of the jaw passageways relative to the chuck axis, and the area of contact generally between movable abutting surfaces of the chuck components between application of the sleeve tightening torque and the application of the grip torque determine the amount of closing force the jaws apply to a bit shank (i.e. grip torque) in response to the torque the user applies to the sleeve at the point the sleeve moves from the first to the second rotational position (i.e. at the point the clutch actuates to move the chuck from the unlocked to the locked condition). That is, the mechanical interface between the nut and the jaws (i.e. between their threads), the mechanical interface between the sleeve and the lock ring, the mechanical interface between the nut and the body, the mechanical interface between the jaws and the body, and the mechanical interface between the nut and the lock ring determine how the sleeve, the lock ring, the nut, and the jaws translate the tightening torque the user applies to the sleeve into grip torque that the jaws apply to the bit shank. In the embodiments described herein, these variables are also chosen so that when the sleeve moves from the first to the second position (i.e. the chuck moves from the unlocked to the locked condition) at the desired user-applied sleeve torque, the mechanism of the chuck between the sleeve and the jaws applies at least a sufficient amount of grip torque to the bit shank that is sufficient to secure the bit shank in the chuck for chuck's expected normal operation without slipping of the shank in the jaws. Thus, the first audible and tactile indication the user receives from the chuck that the chuck has moved to the locked position occurs not only at the point that the user has generally applied the maximum user-applied torque to the sleeve, but also at a point at which the chuck has fully tightened its grip of the tool shank to a predetermined desired level. Of course, the level of desired griping torque might vary among different circumstances. Once the desired grip torque is defined, however, the variables described above may be selected to provide that grip torque in the circumstance where the sleeve moves from the first to the second rotational position, and therefore that the chuck moves from the unlocked to the locked state, upon application of approximately or nearly sixty inch-pounds of closing torque to the sleeve.

In a second embodiment, and referring to FIGS. 4, 5, 6A-6E, and 7, the components and construction of chuck 10 are the same as the components and construction of chuck 10 described above with respect to FIGS. 1, 2, and 3A-3E, except that one side of each of teeth 63 and each of teeth 84 is angled with respect to chuck axis 30, rather than parallel to the axis, and (optionally) that the angular width of recess 69 is slightly different. With regard to the teeth, each tooth of tooth rings 63 and 84 is saw tooth-shaped. Each tooth has a first side with a slope approaching 90 degrees with respect to chuck axis 30. The opposing side, in the angular direction, has a lesser slope, thereby allowing teeth 63 to slip over teeth 84 in the chuck's closing direction 90 but not in the opposite, opening direction 92. In the embodiment described above with respect to FIGS. 1-3E, the angular width of gap 69 was such that when engagement surface 105 engages surface 115 of gap 103, there is a slight angular gap between the leading edge of sleeve dog 641 and surface 108 in order to allow a slight relative movement between the sleeve cam dog 67 and lock ring 60 and nut 16 as lock ring 60 moves axially forward against the bias of spring 95, as shown in FIG. 3D. In the embodiment illustrated in FIGS. 4, 5, 6A-6E, and 7, and referring specifically to FIG. 6D, sleeve dog 641 reaches edge 108 simultaneously or slightly before surface 105 reaches or would reach surface 115. As the user applies tightening torque to the sleeve in closing direction 90, dog 641 transfers this torque directly to the nut at surface 108. As this torque overcomes the frictional force between the angled sides of teeth 63 and 84, the torque applied by sleeve 18 to nut 16 through drive dog 641 begins to move nut 16 and lock ring 60 in rotational closing direction 90. Since nut retainer 70 remains rotationally fixed to the body, this causes the sloped sides of teeth 63 to ride up and over the sloped sides of teeth 84, moving lock ring 60 axially forward against the bias of spring 95. The other operations illustrated in FIGS. 6A-6E, and FIG. 7, e.g. of opening and closing the chuck, and moving the chuck between the locked and unlocked positions, remain the same as discussed above with respect to the first embodiment.

Figure 8:
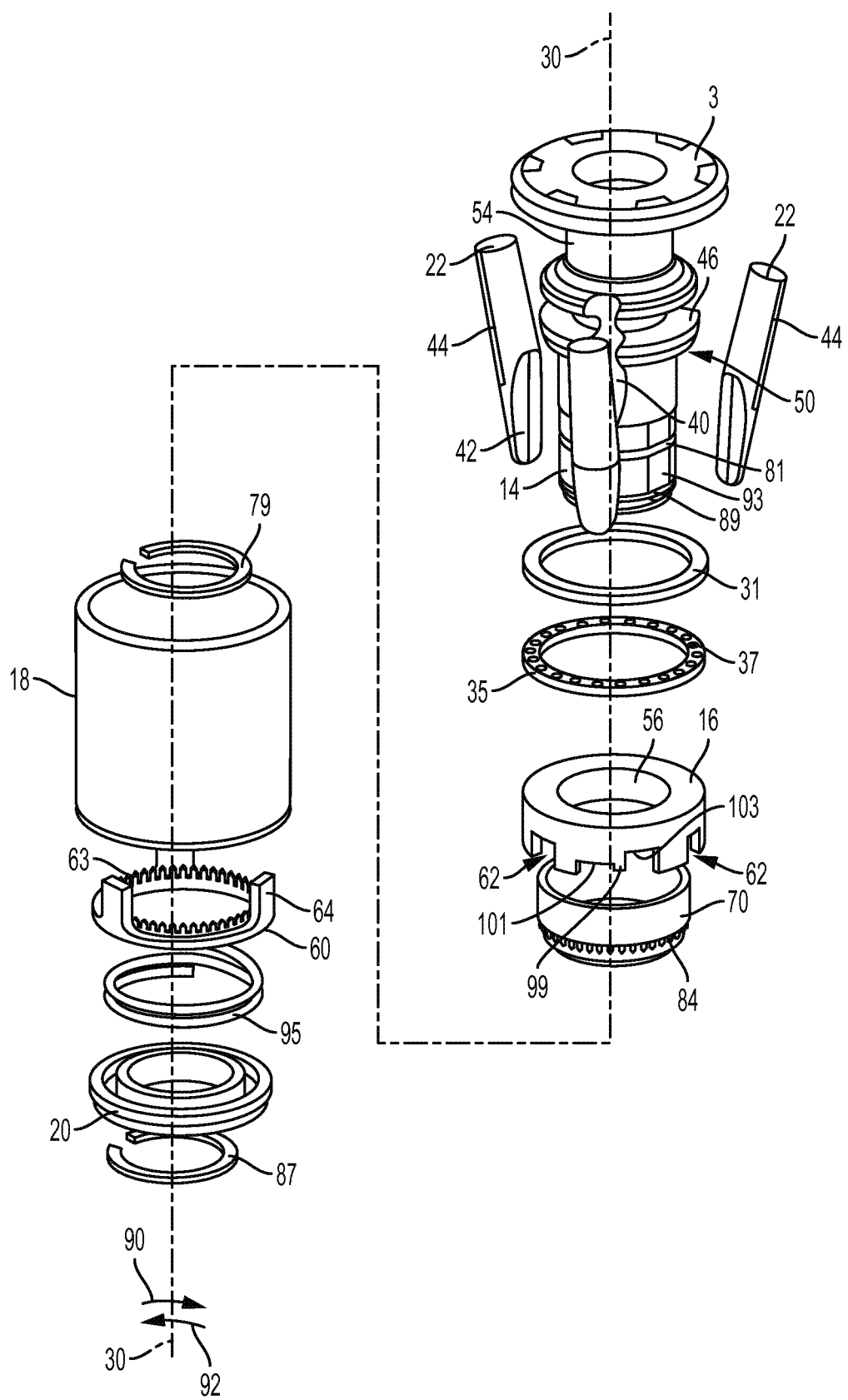
FIG. 8 is an exploded perspective view of a chuck in accordance with an embodiment of the present disclosure.
Figure 9:
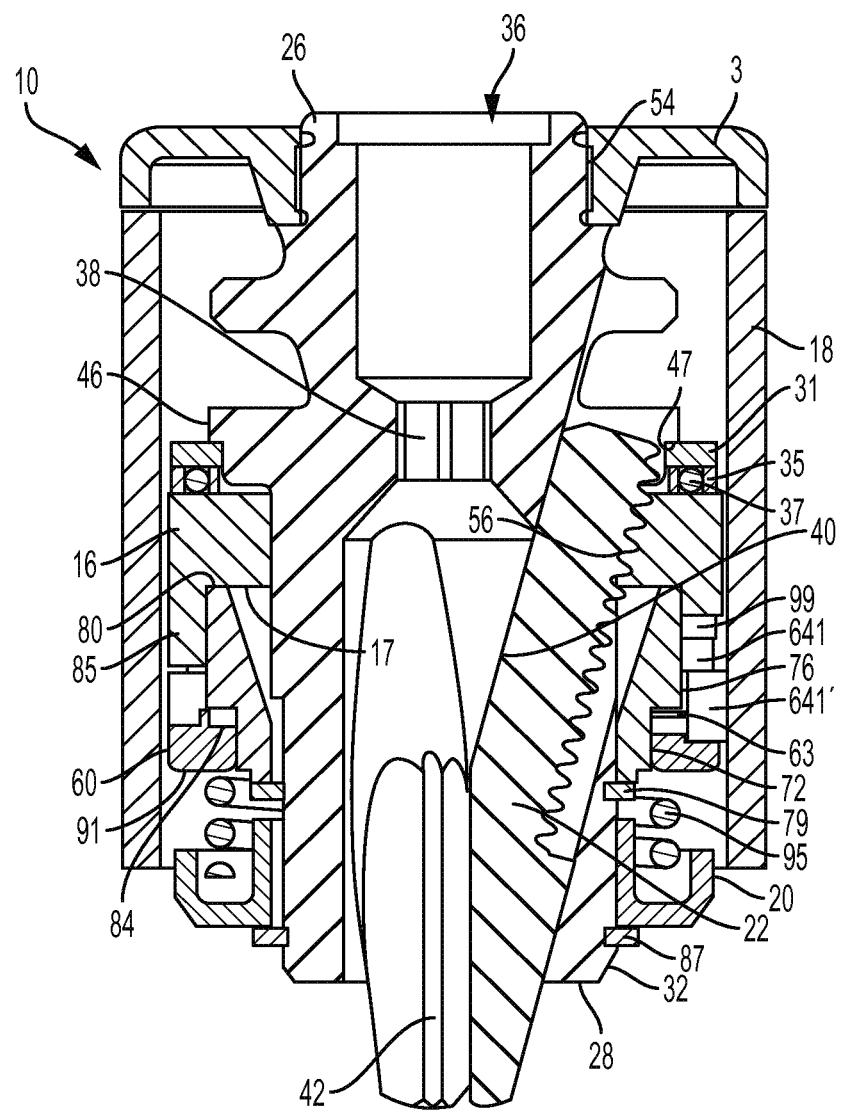
FIG. 9 is a longitudinal view, in section, of a chuck as shown in FIG. 8.

In the embodiment illustrated in FIGS. 8, 9, and 10, teeth 63 and 84 are again straight-sided and parallel to each other and axis 30, and chuck body 14 is configured to be attached an impact driver. For example, threaded rear bore 36 may receive a ¼ inch hex adapter insert that is threaded into rear bore 36 and that defines a quarter-inch hex outer surface on its opposite end. The hex end is received into a correspondingly-shaped hex connector of an impact driver. In a further embodiment, bore 36 is not threaded and, instead, defines a square-shaped bore with detent dimples or groove(s) to receive a ball detent of a square connector extending from the impact driver tool. As should be understood, impact drivers apply repeated conferential forces about the driver's operative axis and, therefore, about the chuck axis. The straight-sided teeth 63 and 84 assist in resisting unwanted opening and over tightening of the chuck.

In this embodiment, dogs 64 of lock ring 60 remain received in nut recesses 62, thereby rotationally locking nut 16 and lock ring 60 to each other. Cam dog 99, and gaps 101 and 103, however, are defined in the forward surface of nut 16, rather than in the lock ring. Thus, sleeve cam dog 67 (FIG. 1 and FIGS. 3A-3E) is omitted in this embodiment. Sleeve drive dogs 641 function both as drive dogs and cam dogs, and the axially forward ends of sleeve drive dogs 641 are received in respective recesses 119 defined in the axially rearward face of lock ring 60 between adjacent lock ring drive dogs 64.

When sleeve drive dogs 641 are received in respective gaps 101 in the forward face of nut 16, the axially forward ends of sleeve drive dogs 641 push lock ring 60 axially forward against the bias of spring 95, thereby disengaging teeth 63 from teeth 84 and allowing nut 16 and lock ring 60 to rotate with respect to the body.

If the user grips sleeve 18 and applies torque to sleeve 18 in opening direction 92, the sleeve rotates with respect to the nut and the lock ring until the leading edges of sleeve drive dogs 641 (which extend from a base portion 641') engage respective side edges 110 of nut dogs 85. Upon applying further torque to the sleeve in opening direction 92, drive dogs 641 turn nut 16 in the opening direction. If the user applies tightening torque to sleeve 18 in closing direction 90, drive dogs 641 move angularly in gap 101 until the leading edges of dogs 641 reach engaging surfaces 107 of respective nut cam dogs 99. Surface 107 is generally planar and is disposed at an acute angle with respect to chuck axis 30. As the user continues to apply tightening torque to sleeve 18 in closing direction 90, dogs 641 apply closing force to dogs 99, thereby causing nut 16 and lock ring 60 to rotate in closing direction 90 and moving jaws 22 radially inward in respective passageways 40 until the jaws grip a tool shank. When the jaws grip the tool shank, the nut resists further rotation due to a wedge between the nut threads and the jaw threads as described above. The chuck construction variables discussed above, now including the slope angle of surfaces 107 of nut cam dogs 99 with respect to the chuck axis, are chosen so that drive dogs 641 move up sloped engagement faces 107 and over cam dogs 99 and into gaps 103 at approximately sixty inch-pounds of tightening torque applied to the sleeve, or slightly below that level. This causes sleeve 18 to move slightly axially as the drive dogs move over cam dogs 99 and as the drive dogs drop into gap 103. As in the embodiments described above, there are three equidistantly spaced pairs of dogs 641/99.

When drive dogs 641 move over cam dogs 99, the force applied by spring 95 in the rearward axial direction pushes lock ring 60 and drive dogs 641 (and, therefore, sleeve 18) in the axially rearward direction until drive dogs 641 are fully received in respective gaps 103. The height of cam dogs 99 with respect to drive dogs 641, and the orientation of teeth 63 with respect to drive dogs 641, are selected so that when drive dogs 641 are received in gaps 101 and are passing over cam dogs 99, teeth 63 are disengaged from teeth 84 but that when the drive dogs are received in gaps 103, teeth 63 engage teeth 84, thereby rotationally locking nut 16 to body 14. As the sides of drive dogs 641 are parallel to each other and to chuck axis 30, as are the opposing sides of gap 103, the user is unable to further tighten nut 16 simply by applying tightening torque to sleeve 18. The user may, however, grip the sleeve and move the sleeve axially forward against the bias of spring 95 until teeth 63 disengage from teeth 84. At this point, drive dogs 641 remain within gaps 103. If the user then applies a tightening torque to sleeve 18 in closing direction 90, the leading edges of sleeve drive dogs 641 engage edges 108 of gaps 69, thereby allowing the user to apply further tightening torque to the nut.

To open the chuck from this condition, the user grips sleeve 18 and pulls the sleeve axially forward against the bias of spring 95 until teeth 63 disengage from teeth 84. At the point that drive dogs 641 reach the height of cam dogs 99, the user may turn sleeve 84 in opening direction 92 so that drive dogs 641 move angularly within recesses 119 until dogs 641 pass over dogs 99 and return to gaps 101. The user may further rotate sleeve 18 until the leading edge of dogs 641 engage edges 110 of a dog 85, at which point the user may apply loosening torque to the nut.

While one or more preferred embodiments of the present image have been described above, it should be understood that any and all equivalent realizations of the present invention are included within the scope and spirit of the present disclosure. Thus, the depicted embodiments are presented by way of example only and are not intended as limitations on the present invention. It should be understood that aspects of the various one or more embodiments may be interchanged both in whole or in part. Therefore, it is contemplated that any and all such embodiments are included in the present invention as may fall within the literal or equivalent scope of the present disclosure.

What is claimed is:

1. A chuck for use with a manual or powered driver having a rotatable drive shaft, the chuck comprising:
  a body having a nose section, a tail section, and a center axis, the tail section being configured to rotate with the drive shaft and the nose section having an axial bore formed therein and a plurality of passageways formed therethrough and intersecting the axial bore;
  a plurality of jaws movably disposed in the passageways;
  a nut rotatably mounted about the body and in operative communication with the jaws so that rotation of the nut in a closing direction with respect to the body moves the jaws toward the center axis of the body and rotation of the nut in an opening direction with respect to the body moves the jaws away from the center axis of the body;

a sleeve rotatably mounted about the body, the sleeve being in operative communication with the nut so that the sleeve rotationally drives the nut but is rotatable with respect to the nut between a first rotational position and a second rotational position;

an annular array of first teeth that are non-rotatable about the center axis with respect to the body and facing toward the nose section of the body;

one or more second teeth disposed on a ring, the second teeth being non-rotatable about the center axis with respect to the nut and axially movable with respect to the body, the one or more second teeth being configured so that when the one or more second teeth engage the first teeth, the one or more second teeth and the first teeth resist rotation of the one or more second teeth, and thereby the nut, in the opening direction with respect to the body; and an engagement between the sleeve and the ring that moves the one or more second teeth out of engagement with the first teeth when the sleeve moves from the second rotational position to the first rotational position and that moves the one or more second teeth into engagement with the first teeth when the sleeve moves from the first rotational position to the second rotational position;

wherein the engagement comprises respective opposing cam surfaces on an inner surface of the sleeve and the ring;

wherein the ring defines a first recess and a second recess on opposite sides of the cam surface defined on the ring, wherein the first recess defines a first axial distance between the one or more second teeth and a depth of the first recess, wherein the second recess defines a second axial distance between the one or more second teeth and a depth of the second recess that is greater than the first distance, and wherein the cam surface defined on the sleeve is received at the first recess in the first rotational position of the sleeve and is received at the second recess at the second rotational position of the sleeve.

2. The chuck as in claim 1, comprising a plurality of the one or more second teeth.

3. The chuck as in claim 2, comprising a spring that biases the ring toward the first teeth.

4. The chuck as in claim 2, wherein the first teeth and the plurality of second teeth have sides that are aligned in parallel with the center axis.

5. The chuck as in claim 2, wherein the first teeth and the plurality of second teeth have sides that are aligned at an acute angle with respect to the center axis.

6. The chuck as in claim 2, wherein the first teeth and the plurality of second teeth have sides that are aligned in parallel with the center axis, and wherein the sleeve is axially movable with respect to the body.

7. The chuck as in claim 1, wherein a spring is disposed between the body and the ring and biases the ring against the sleeve and toward the first teeth.

8. A chuck for use with a manual or powered driver having a rotatable drive shaft, the chuck comprising:

a body having a nose section, a tail section, and a center axis, the tail section being configured to rotate with the drive shaft and the nose section having an axial bore formed therein and a plurality of passageways formed therethrough and intersecting the axial bore;

a plurality of jaws movably disposed in the passageways;

a sleeve rotatably mounted about the body and in operative communication with the jaws so that rotation of the sleeve in a closing direction with respect to the body moves the jaws toward the center axis of the body and rotation of the sleeve in an opening direction with respect to the body moves the jaws away from the center axis of the body;

a lock disposed operatively between the sleeve and the jaws, the sleeve being in operative communication with the lock so that the sleeve rotationally drives the lock but is rotatable with respect to the lock between a first rotational position and a second rotational position;

an annular array of first teeth that are non-rotatable about the center axis with respect to the body and facing toward the nose section of the body; and an engagement between the sleeve and a nut that moves the lock from a first condition at which the angular array of first teeth are engaged and the lock resists movement of the jaws in the passageways away from the center axis to a second condition at which the angular array of first teeth are not engaged and the lock permits movement of the jaws in the passageways away from the center axis when the sleeve moves from the second rotational position to the first rotational position and that moves the lock from the second condition to the first condition when the sleeve moves from the first rotational position to the second rotational position, wherein the engagement is configured so that a rotational torque applied to the sleeve at which the sleeve moves from the first rotational position to the second rotational position corresponds to an output gripping force between said plurality of jaws that is sufficient to secure a tool in the chuck for a predetermined purpose;

wherein the engagement comprises respective opposing cam surfaces on an inner surface of the sleeve and the nut;

wherein the nut defines a first recess and a second recess on respective opposite sides of the cam surface defined on the nut, wherein the first recess defines a first axial distance between the first teeth and a depth of the first recess, wherein the second recess defines a second axial distance between the first teeth and a depth of the second recess that is greater than the first distance, and wherein the cam surface defined on the sleeve is received at the first recess in the first rotational position of the sleeve and is received at the second recess at the second rotational position of the sleeve.

9. The chuck as in claim 8, wherein the nut rotatably is mounted about the body and in operative communication with the jaws so that rotation of the nut in a closing direction with respect to the body moves the jaws toward the center axis of the body and rotation of the nut in an opening direction with respect to the body moves the jaws away from the center axis of the body, wherein the sleeve rotationally drives the nut but is rotatable with respect to the nut between the first rotational position and the second rotational position, wherein the lock comprises one or more second teeth that are non-rotatable about the center axis with respect to the nut and axially movable with respect to the body, the one or more second teeth being configured so that when the one or more second teeth engage the first teeth, the one or more second teeth and the first teeth resist rotation of the one or more second teeth, and thereby the nut, in the opening direction with respect to the body, and wherein the engagement is defined between the sleeve and the nut so that the engagement moves the one or more second teeth out of engagement with the first teeth when the sleeve moves from the second rotational position to the first rotational position and moves the one or more second teeth into engagement with the first teeth when the sleeve moves from the first rotational position to the second rotational position.

10. The chuck as in claim 9, comprising a plurality of the one or more second teeth.

11. The chuck as in claim 10, wherein the plurality of second teeth are defined on the lock and the lock comprises an annular ring about the body, wherein the lock is rotationally fixed but axially movable with respect to the nut.

12. The chuck as in claim 11, comprising a spring that biases the annular ring toward the first teeth.

13. The chuck as in claim 10, wherein the first teeth and the plurality of second teeth have sides that are aligned in parallel with the center axis.

14. The chuck as in claim 8, wherein the engagement is configured so that the rotational torque is approximately sixty inch-pounds.

15. The chuck as in claim 8, wherein the engagement is configured so that the rotational torque is approximately fifty-seven inch-pounds.

16. The chuck as in claim 8, wherein one of the respective opposing cam surfaces between the nut and the sleeve is defined at an acute angle with respect to the center axis and wherein the rotational torque comprises a torque required to move the opposing cam surfaces past each other as the sleeve moves from the first rotational position to the second rotational position.

17. The chuck as in claim 9, wherein a spring is disposed between the body and the annular ring and biases the annular ring against the sleeve and toward the first teeth.

18. The chuck as in claim 9, wherein the first teeth and the one or more second teeth have sides that are aligned in parallel with the center axis, and wherein the sleeve is axially movable with respect to the body.

19. A chuck for use with a manual or powered driver having a rotatable drive shaft, the chuck comprising:

a body having a nose section, a tail section, and a center axis, the tail section being configured to rotate with the drive shaft and the nose section having an axial bore formed therein and a plurality of passageways formed therethrough and intersecting the axial bore;

a plurality of jaws movably disposed in the passageways;

a nut rotatably mounted about the body and in operative communication with the jaws so that rotation of the nut in a closing direction with respect to the body moves the jaws toward the center axis of the body and rotation of the nut in an opening direction with respect to the body moves the jaws away from the center axis of the body;

a sleeve rotatably mounted about the body, the sleeve being in operative communication with the nut so that the sleeve rotationally drives the nut but is rotatable with respect to the nut between a first rotational position and a second rotational position;

an annular array of first teeth that are non-rotatable about the center axis with respect to the body and facing toward the nose section of the body;

one or more second teeth disposed on a ring, the second teeth being that are non-rotatable about the center axis with respect to the nut and axially movable with respect to the body, the one or more second teeth being configured so that when the one or more second teeth engage the first teeth, the one or more second teeth and the first teeth resist rotation of the one or more second teeth, and thereby the nut, in the opening direction with respect to the body; and an engagement between the sleeve and the ring that moves the one or more second teeth out of engagement with the first teeth when the sleeve moves from the second rotational position to the first rotational position and that moves the one or more second teeth into engagement with the first teeth when the sleeve moves from the first rotational position to the second rotational position, wherein the engagement is configured so that a rotational torque applied to the sleeve at which the sleeve moves from the first rotational position to the second rotational position is approximately fifty-seven inch-pounds or approximately sixty inch-pounds;

wherein the engagement comprises respective opposing cam surfaces on an inner surface of the sleeve and the ring, wherein the ring defines a first recess and a second recess on opposite sides of the cam surface defined on the ring, wherein the first recess defines a first axial distance between the plurality of second teeth and a depth of the first recess, wherein the second recess defines a second axial distance between the plurality of second teeth and a depth of the second recess that is greater than the first distance, and wherein the cam surface defined on the sleeve is received at the first recess in the first rotational position of the sleeve and is received at the second recess at the second rotational position of the sleeve.

* * * * *